United States Patent [19]

Morimoto

[11] Patent Number: 4,878,633
[45] Date of Patent: Nov. 7, 1989

[54] DRAG MECHANISM FOR A DOUBLE-BEARING FISHING REEL

[75] Inventor: Shinichi Morimoto, Nishinomiya, Japan

[73] Assignee: Shimano Industrial Company Limited, Osaka, Japan

[21] Appl. No.: 176,768

[22] Filed: Apr. 1, 1988

[30] Foreign Application Priority Data

Apr. 6, 1987 [JP] Japan .............................. 62-51990[U]

[51] Int. Cl.$^4$ .............................................. A01K 89/01
[52] U.S. Cl. ................................................. 242/268
[58] Field of Search ................... 242/84.5 R, 84.5 A, 242/84.51 R, 84.51 A, 220, 221, 218, 217, 219

[56] References Cited

U.S. PATENT DOCUMENTS

| | | | |
|---|---|---|---|
| 3,425,644 | 2/1969 | Griste | 242/219 |
| 3,478,979 | 11/1969 | Henze | 242/219 |
| 3,946,963 | 3/1976 | Oberg . | |
| 4,124,174 | 11/1978 | Kelly . | |
| 4,391,419 | 5/1983 | Iwama | 242/84.5 A |
| 4,422,600 | 12/1983 | Preston . | |
| 4,516,741 | 5/1985 | Hashimoto | 242/217 |
| 4,616,792 | 10/1986 | Tunks . | |
| 4,634,079 | 1/1987 | Furomoto | 242/219 |

FOREIGN PATENT DOCUMENTS 57-39027 8/1982 Japan .
2179753 3/1987 United Kingdom .
2181331 4/1987 United Kingdom .

Primary Examiner—Stuart S. Levy
Assistant Examiner—Katherine Matecki
Attorney, Agent, or Firm—Stevens, Davis, Miller & Mosher

[57] ABSTRACT

A fishing reel is provided which includes a drag mechanism provided between a handle shaft and a main gear of the reel. The drag mechanism presets to an optimum value a slipping rotation starting load for a spool by operating a load setting member, and also enables the angler to set, by employing a reference portion and a position setting portion, the drag mechanism at the position at which the optimum slipping rotation start load value is obtained. The load setting member is operated to adjust the preset optimum slipping rotation start load value, and after the adjustment, the load setting member is returned easily and accurately to the position at which the optimum slipping rotation start lead value is obtained.

7 Claims, 2 Drawing Sheets

DRAG MECHANISM FOR A DOUBLE-BEARING FISHING REEL

FIELD OF THE INVENTION

The present invention relates to a drag mechanism for a fishing reel, particularly a double-bearing fishing reel, and more particularly, to a drag mechanism for a double-bearing fishing reel, which has a spool shaft rotatably supported to a reel body and carrying a spool so as to transmit a driving force to the spool and to apply a braking force against rotation of the spool when operation of a driving mechanism stops.

BACKGROUND OF THE INVENTION

Japanese Utility Model Publication Gazette No. Sho 57-39,027 discloses a double-bearing fishing reel provided with drag members between a handle shaft rotatably supported to the reel body and a main geaar relative-rotatably supported thereto and having a load setting member screwably supported to the handle shaft for applying a predetermined load to the drag members, so that the load setting member is rotatably operated to adjust the load to be applied to the drag members, i.e., a slipping rotation starting load for the spool.

In greater detail, the slipping rotation starting load for the spool is set by the load setting member corresponding to a proof stress of a fishing line, so that, when the load acting thereon is smaller than the slipping rotation starting load for the spool, a driving force applied by the handle is transmitted from the main gear to the spool to be driven. When the load is larger than the slipping rotation starting load, the drag members slip so as not to transmit the driving force of the handle to the spool, or the spool slipping rotates even when the handle stops, and is subjected to a predetermined braking force.

The load setting member, as described above, sets the slipping rotation starting load for the spool to an optimum load corresponding to a target fish in consideration of the proof stress of the fishing line, with the load setting member being operated to adjust the setting load corresponding to a pulling force of the fish each time it is hooked.

The load setting member, which is controllable between the position where the drag members are subjected to a minimum load and the position where they are subjected to a maximum load, is very difficult to return to the position where the optimum load is obtained after being rotatably adjusted from the optimum load position corresponding to the pulling force of the hooked fish. Therefore, the load setting member, even when preset at the position where the optimum slipping rotation starting load for the spool is obtained for fishing the same kind of fish having an approximately equal pulling force when hooked, shifts in position each time the setting member is adjusted, thereby creating a problem in that the fishing reel is inconvenient to use and has poor fishing efficiency.

SUMMARY OF THE INVENTION

An object of the invention is to provide a drag mechanism for a double-bearing fishing reel, which can desirably set the slipping rotation starting load for a spool to an optimum value by drag members, adjust the optimum load by operating a load setting member, and reposition the load setting member with ease and accuracy at the position at which the preset optimum load is obtained.

The drag mechanism of the invention applies a braking force against relative rotation with respect to a drive mechanism for driving the spool at the double-bearing fishing reel, i.e., transmits a driving force of the driving mechanism to the spool and sets a slipping rotation starting load therefor. The drag mechanism is characterized by providing drag members provided between a handle shaft journalled to a reel body at the double-bearing fishing reel and a main gear supported to rotate relative to the handle shaft. A load setting member is screwably mounted on the handle shaft so as to set a slipping rotation starting load for the spool by the drag members. A references portion is provided at one of the handle shaft and a load setting member to thereby set a reference position of the slipping rotation starting load for the spool. A position setting portion is provided at the other of the handle shaft and a load setting member for setting the reference position thereof corresponding to the reference portion. The reference portion or the position setting portion can be changed in position with respect to one of the handle shaft and load setting member provided with the reference ortion and position setting portion respectively.

In the above described construction, the load setting member is rotatably operated to preset the slipping rotation starting load for the spool by the drag members to an optimum value corresponding to a target fish.

Hence, the reference portion or the position setting portion rotates together with the load setting member to result in a variation of the phase relationship between the reference portion and the position setting portion. After the load setting member sets the optimum load, one of the reference portion and the position setting portion is shifted with respect to the other and coincident therewith, thereby setting the reference position of the load setting member.

In such condition, the load setting member is rotated to adjust the present optimum load and also returned to the position at which the reference portion coincides with the position setting portion, thereby enabling the load setting member to be returned easily and accurately to the position at which the preset optimum load is obtained.

Accordingly, an angler, even when he adjusts the preset optimum load corresponding to a hooked fish, can easily determine the adjusted position by the reference portion, whereby he mates the position setting portion only with the reference portion without the need to adjust the optimum load, thus conserving his labor to that extent.

The above and further objects and novel features of the invention will be more fully apparent from the following detailed description when the same is read in connection with the accompanying drawings.

DETAILED DESCRIPTION OF THE PREFERRED EMBODIMENTS

Figure 2:
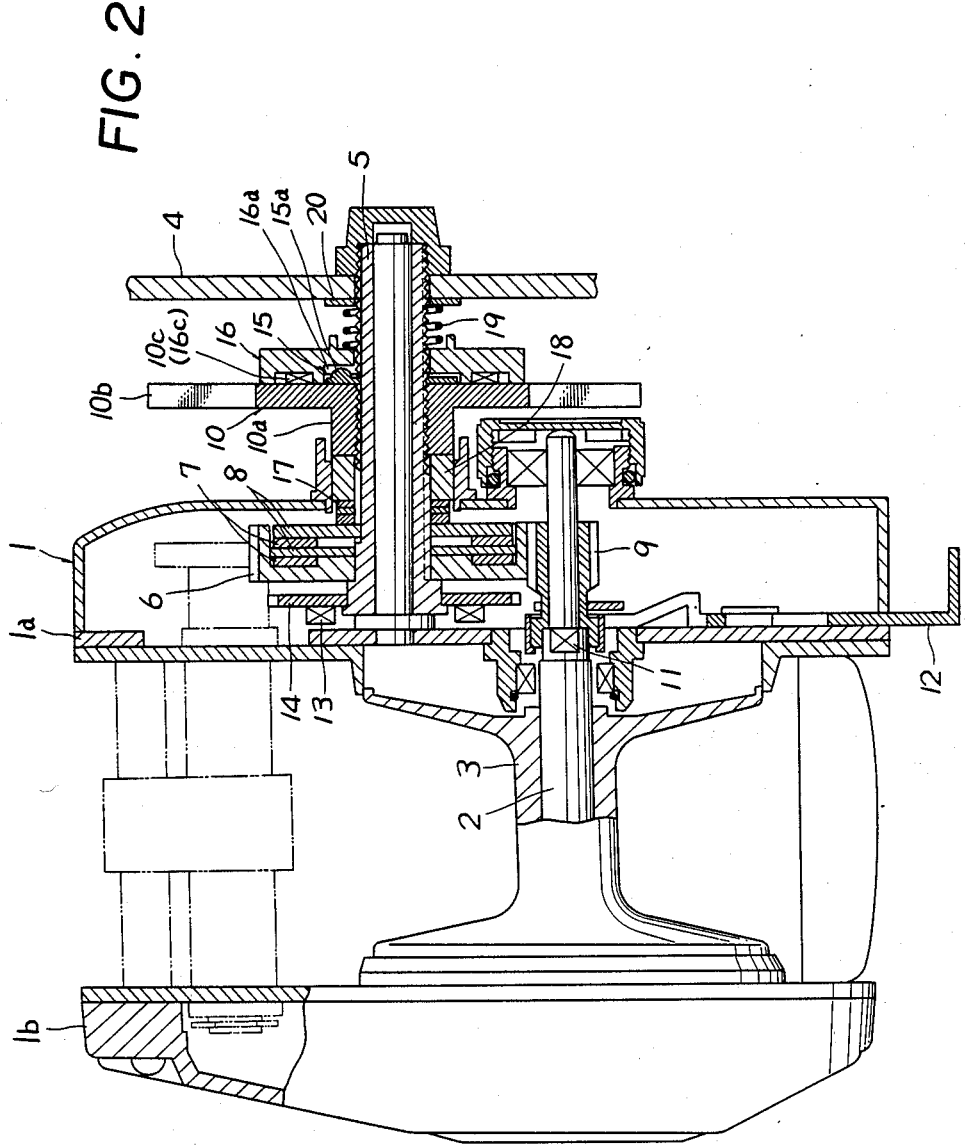
FIG. 2 is a partial sectional view of an entire double-bearing fishing reel incorporating the drag mechanism illustrated in FIG. 1, and FIGS. 3 and 4 are partial sectional view of the second and third embodiments of the invention, corresponding to FIG. 1.

The double-bearing fishing reel equipped with the drag mechanism of the invention, as shown in FIG. 2, is constructed such that a spool 3 having a spool shaft 2 and a handle shaft 5 having a handle 4 are rotatably supported to a reel body 1 provided with a pair of side frames 1a and 1b. A main gear 6 is supported to the handle shaft 5 to be rotatable relative thereto. Drag members 7 abutting against one side surface of main gear 6 and drag discs 8 abutting against drag members 7 are mounted on handle shaft 5. A pinion 9 engageable with main gear 6 is slidably supported onto spool shaft 2, and a load setting member 10 for setting a slipping rotation starting load for spool 3 by drag members 7 is screwed with handle shaft 5. A driving force applied by rotation of handle 4 is transmitted to spool 3 through handle shaft 5, drag members 7, main gear 6, pinion 9 and spool shaft 2, thereby driving spool 3. Also, clutch means 11 is provided between pinion 9 and spool shaft 2, and a clutch lever 12 is slidably supported to first side frame 1a and pushed to slide pinion 9 so as to disconnect clutch means 11. A return plate 14 having clutch pins 13 is supported to handle shaft 5 so that handle 4 is reversely rotated to allow clutch pin 13 to hit the utmost end of clutch lever 12, thereby returning clutch lever 12 to engage clutch means 11. In addition, drag members 7 and drag discs 8 are alternately disposed, with outermost drag disc 8 being non-rotatable relative to but axially movable with respect to handle shaft 5.

Figure 1:
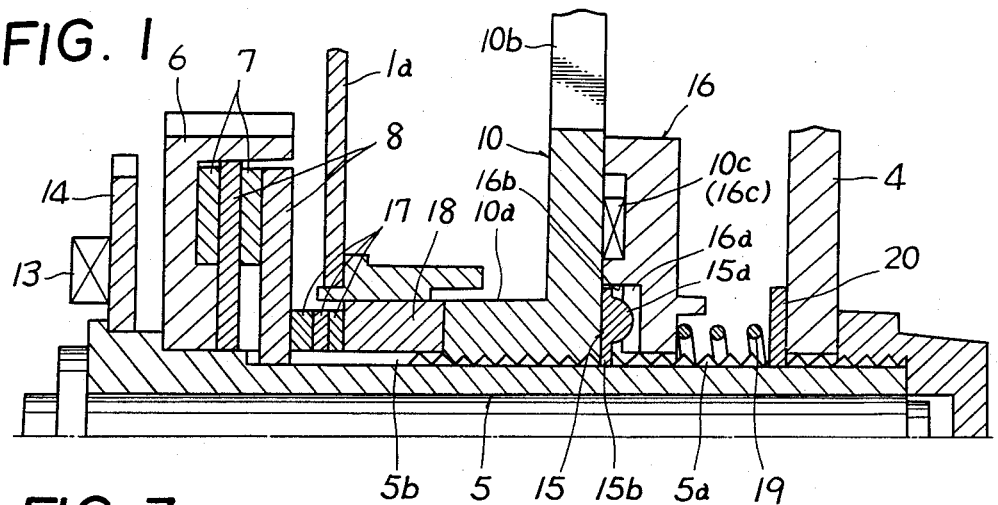
FIG. 1 is a partial sectional view of a first embodiment of a drag mechanism of the invention.

In a first embodiment shown in FIGS. 1 and 2, a reference member 15 having a reference portion 15a is non-rotatably but axially movably supported to handle shaft 5, and an operating member 16 having a position setting portion 16a corresponding to reference portion 15a is provided at load setting member 10 to be changeable in position with respect thereto.

In the above-described construction, handle shaft 5 is provided at the outer periphery thereof with a screw thread 5a and axially extending grooves 5b.

Load setting member 10 comprise a boss 10a having a threaded bore screwable with screw thread 5a at handle shaft 5 and a plurality of operating portions 10b extending radially outwardly from the outer periphery of boss 10a. A plurality of washers 17 and a bush 18 are interposed between boss 10a and drag disc 8, so that an operating force of load setting member 10 is transmitted to drag members 7 through washers 17, bush 18 and drag discs 8.

Reference member 15 is formed of a disc which has a through bore fitted on handle shaft 5 and an engaging projection 15b projecting from the inner surface of the through bore and engageable with groove 5b at handle shaft 5 to be non-rotatable with respect thereto, with reference portion 15a projecting from one side surface of the reference member 15. In addition, reference portion 15a preferably has a hemispherical shape as shown.

Operating member 16 is substantially disc-shaped, has a through bore rotatably fitted on handle shaft 5, abuts against one side surface of load setting member 10, and is provided at a central portion of its inside surface with an annular portion 16b receiving therein reference member 15. Operating member 16 is provided in receiving portion 16b with a position setting portion 16a. Also, between the inside surface of operating member 16 and the outside surface of load setting member 10 are provided engaging portions 10c and 16c having changeable engaging positions, so that, when engaging portions 10c and 16c engage with each other, operating member 16 is adapted to rotate in association with load setting member 10. Between operating member 16 and handle 4 is interposed a spring 19 for biasing position setting portion 16a toward reference portion 15a so as to maintain the engagement of engaging portions 10c and 16c. In addition, position setting portion 16a is recessed to be engageable with reference portion 15a. Also, engaging portions 10c and 16c are formed in, for example, a spline coupling arrangement.

A disc-like display member 20 having a display (not shown) corresponding to reference portion 15a is supported on an exposed portion at handle shaft 5 so as to not rotated relative to shaft 5, so that the angler can view the exposed display and be easily informed of the position of reference portion 15a.

When the angler uses the fishing reel constructed as described above, he, prior to fishing, rotates load setting member 10 and presets the slipping rotation starting load for spool 3 by drag members 7 corresponding to the kind of fish to be hooked. In this case, since engaging portions 10c and 16c engage with each other, despite the engagement of position setting portion 16a and reference portion 15a, operating member 16 rotates together with load setting member 10, at which time operating member 16 moves away from load setting member 10 (rightwardly in FIG. 1) against spring 19, thereby disengaging position setting portion 16a from reference portion 15a. Hence, load setting member 10 is rotatably operated as described above, thereby enabling the slipping rotation starting load for spool 3 established by drag members 7 to be set to an optimum value.

After the load is set, operating member 16 is gripped by the angler's hand so as to be moved away from load setting member 10, thereby disengaging engaging portions 10c and 16c from each other. In this disengaging condition, operating member 16 is rotated to engage position setting portion 16a with reference portion 15a. In this case, operating member 16 is released from rotation at the position where the position setting portion 16a engages with reference portion 15a, and spring 19 restores operating member 16 and causes engaging portions 10c and 16c to engage with each other.

During fishing after presetting the slipping rotation starting load for spool 3, load setting member 10 is rotated corresponding to a pulling force of a hooked fish so that the load set by drag members 7 is adjusted with respect to the preset optimum value for hooking a fish.

After the fish is hooked, load setting member 10 is returned to the position where position setting portion 16a coincides with reference portion 15a, thereby enabling load setting member 10 to be positioned easily and accurately in order to obtain the present optimum value.

Accordingly, load setting member 10 is desirably controllable corresponding to the pulling force of a hooked fish and can also be returned easily and accurately to the position where the optimum value is obtained, thereby being convenient to use and facilitating effective fishing. Also, reference portion 15a engages with position setting portion 16a to prevent the load from becoming excessively reduced, thereby preventing the fishing line wound on spool 3 from getting tangled. When spring 19 biases operating member 16 to engage position setting portion 16a with reference portion 15a, the engaging portions therebetween can generate sounds. Hence, the angle hears the sounds to confirm that load setting member 10 has returned to the proper position. Also, he can view display member 20 from the exterior so as to be informed of the accurate position of reference portion 15a. Hence, even when reference portion 15a does not engage with position setting portion 16a, both of these portions can be easily caused to coincide with each other.

Alternatively, in the above-described embodiment, reference portion 15a may be provided at load setting member 10 through operating member 16 and position setting portion 16a may be provided at handle shaft 5 through reference member 15, so that load setting member 10 may be changeable in position with respect to operating member 16. Also, reference portion 15a and position setting portion 16a may not engage with each other but merely coincide with each other. In this embodiment, it is preferable that reference portion 15a and position setting portion 16a be exposed to be visible easily from the exterior.

Figure 3:
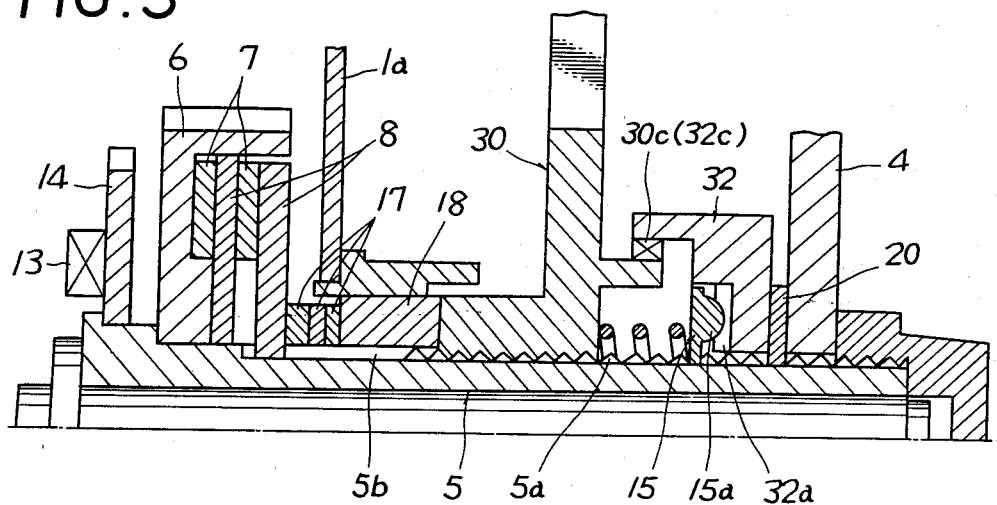

Alternatively, as shown in a second embodiment in FIG. 3, a spring 31 may be interposed between a load setting member 30 and a reference member 15 and an operating member 32 may be movable toward load setting member 30.

In addition, in FIG. 3, engaging portions 30c and 32c are provided between load setting member 30 and operating member 32 the same as in the first embodiment, with a position setting portion 32a engageable with a reference portion 15a at reference member 15 being provided at operating member 32.

Figure 4:
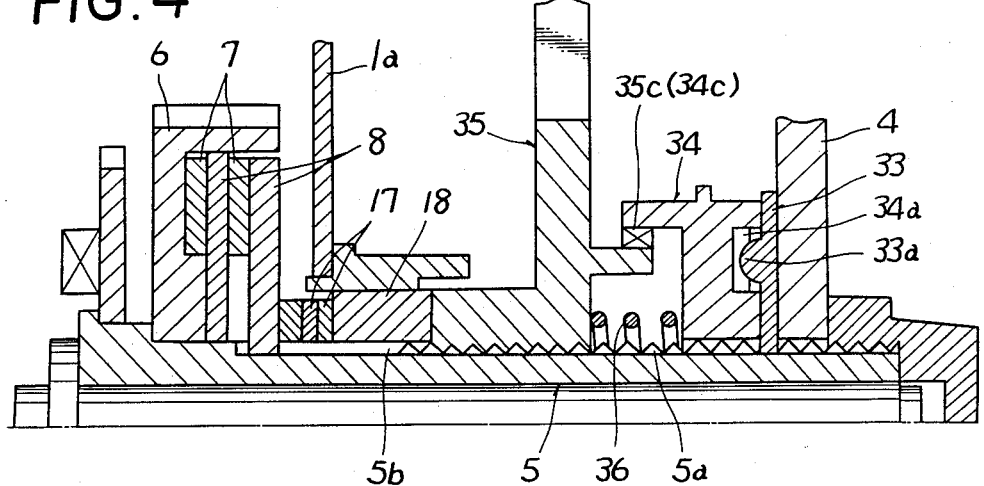

As shown in a third embodiment in FIG. 4, a reference member 33 may be disposed between an operating member 34 and a handle 4 and a spring 36 may be interposed between load setting member 35 and operating member 34.

Also, in FIG. 4, between load setting member 35 and operating member 34 are provided engaging portions 34c and 35c the same as in the first and second embodiments, with operating member 34 having a position setting portion 34a engageable with a reference portion 33a at reference member 33.

As seen from the above, the drag mechanism for the double-bearing fishing reel of the invention is provided at one of handle shaft 5 and load setting member 10 with a reference portion 15a and at the other withh a position setting portion 16a corresponding to reference portion 15a, and position setting portion 16a is made changeable in position with respect to the member provided with the other. Hence, load setting member 10 can rotate to set the slipping rotatiion starting load for the spool at an optimum value. The present optimum value can be adjusted as desired by adjustment of operating member 10, and after the adjustment, reference portion 15a coincides with position setting portion 16a whereby load setting member 10 can be returned easily and accurately to the position at which the preset optimum value is obtained. Accordingly, the fishing is carried out on the basis of this optimum value and the fishing reel is very convenient for use, thereby facilitating the fishing operation.

Although several embodiments have been described, they are merely exemplary of the invention and not to be construed as limiting, the invention being defined solely by the appended claims.

What is claimed is:

1. A fishing reel comprising a reel body, a spool rotatably supported relative to said reel body, a drag mechanism for applying a braking force against rotation of said spool, a handle shaft rotatably supported to said reel body and a main gear supported to rotate responsive to rotation of said handle shaft to drive said spool, said drag mechanism comprising:

a plurality of drag discs supported to said handle shaft so as to be non-rotatable and axially movable relative to said handle shaft;

a plurality of drag members (i) supported to said handle shaft to be rotatable relative to said handle shaft and (ii) interposed between said drag discs and said main gear;

a load setting member screwably mounted on said handle shaft and for adjustably setting a slipping rotation starting load for said spool applied by said drag members, a reference member supported to said handle shaft to be non-rotatable relative to said handle shaft and having a single reference portion for setting a reference position corresponding to an optimum value of said slipping rotation starting load set by said load setting member, an operating member supported to said load setting member to be rotatable with said load setting member to enable said load setting member to be rotatably operable, said operating member having a single position setting portion for setting a reference position for said load setting member corresponding to said reference position, and position change means, provided between said load setting member and said operating member, for enabling said operating member to be changed in position with respect to said load setting member.

2. A fishing reel according to claim 1, wherein said reference member is positioned such that said load setting member is positioned axially between said spool and said reference member, said reference member being supported axially movable relative to said handle shaft, said operating member being positioned such that said reference member is positioned axially between said load setting member and said operating member.

3. A fishing reel according to claim 2, further comprising mutually engaging engagement portions provided between said load setting member and said operating member and means for enabling an engagement position of said engagement portions to be modified to occupy selectably a plurality of engagement positions.

4. A fishing reel according to claim 2, wherein said handle shaft is provided with a handle and further comprising a spring means provided between said operating member and said handle, for biasing said operating member toward said load setting member.

5. A fishing reel according to claim 2, further comprising a spring means interposed between said load setting member and said reference member, for biasing said reference member toward said operating member.

6. A fishing reel according to claim 1, wherein said reference member is positioned such that said load setting member is positioned axially between said spool and said reference member, said reference member being supported axially movably relative to said handle shaft, said operating member being interposed between said load setting member and said reference member.

7. A fishing reel according to claim 6, further comprising a spring means provided between said load setting member and said operating member, for biasing said operating member toward said reference member.

* * * * *